US010594138B2

(12) United States Patent
Blood et al.

(10) Patent No.: US 10,594,138 B2
(45) Date of Patent: Mar. 17, 2020

(54) DETECTION AND REMEDIATION OF TRANSIENTS IN ELECTRIC POWER SYSTEMS

(71) Applicant: Schweitzer Engineering Laboratories, Inc., Pullman, WA (US)

(72) Inventors: Ellery A. Blood, Moscow, ID (US); David M. Gneiting, Pullman, WA (US); Jedidiah W. Bartlett, Uniontown, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 822 days.

(21) Appl. No.: 15/284,811

(22) Filed: Oct. 4, 2016

(65) Prior Publication Data

US 2018/0097363 A1    Apr. 5, 2018

(51) Int. Cl.
*H02J 3/24*    (2006.01)
*H02J 3/00*    (2006.01)

(52) U.S. Cl.
CPC .......... *H02J 3/24* (2013.01); *H02J 2003/007* (2013.01); *Y02E 60/76* (2013.01); *Y04S 40/22* (2013.01)

(58) Field of Classification Search
CPC ....................................................... H02J 3/24
USPC ................................................. 361/21, 20, 1
See application file for complete search history.

(56) References Cited

U.S. PATENT DOCUMENTS

| | | |
|---|---|---|
| 4,916,328 A | 4/1990 | Culp |
| 5,222,009 A | 6/1993 | Scharnick |
| 5,436,510 A | 7/1995 | Gilbert |

(Continued)

FOREIGN PATENT DOCUMENTS

| | | |
|---|---|---|
| DE | 10200733 | 7/2003 |
| EP | 1381132 | 9/2010 |

OTHER PUBLICATIONS

Z. Liu, Z. Chen, H. Sun, and C. Liu, "Control and Protection Cooperation Strategy for Voltage Instability," proceedings of the 47th International Universities Power Engineering Conference, London, UK, Sep. 2012.

Bogdan Otomega, Vincent Sermanson, and Thierry Van Cutsen, "Reverse-Logic Control of Load Tap Changers in Emergency Voltage Conditions," IEEE Bologna Power Tech Conference, Jun. 2003.

(Continued)

*Primary Examiner* — David Luo
(74) *Attorney, Agent, or Firm* — Jared L. Cherry; Bradley W. Schield

(57) ABSTRACT

The present disclosure relates to systems and methods for detection of transients in electric power systems. In one embodiment, a system may detect and remediate a potentially destabilizing transient condition. An angle monitoring subsystem may determine an angle between a first and a second rotating machine based on a plurality of measurements. A system parameter may be determined based on the angle. A stability threshold subsystem may determine a dynamic stability threshold to detect the potentially destabilizing transient condition based on the at least one system parameter. An event detection subsystem may compare at least one metric of instability to the dynamic stability threshold and to detect a first potentially destabilizing transient condition based on the comparison of the at least one metric of instability to the dynamic stability threshold. A remedial action subsystem may implement a first remedial action based on the metric of instability.

28 Claims, 7 Drawing Sheets

(56) References Cited

U.S. PATENT DOCUMENTS

| | | | |
|---|---|---|---|
| 5,644,463 A * | 7/1997 | El-Sharkawi | H01H 9/56 361/2 |
| 6,204,642 B1 | 3/2001 | Lawson | |
| 6,608,635 B1 | 8/2003 | Mumm | |
| 7,457,088 B2 | 6/2008 | Hou | |
| 7,698,233 B1 | 4/2010 | Edwards | |
| 7,999,405 B2 | 8/2011 | Peterson | |
| 8,131,383 B2 | 3/2012 | Pearson | |
| 8,604,803 B2 | 12/2013 | Dooley | |
| 8,606,372 B1 | 12/2013 | Harris | |
| 2002/0091503 A1 | 7/2002 | Carrillo | |
| 2003/0042876 A1 | 3/2003 | Ikeda | |
| 2003/0220740 A1 | 11/2003 | Intriligator | |
| 2004/0257059 A1 | 12/2004 | Mansingh | |
| 2005/0285574 A1 | 12/2005 | Huff | |
| 2006/0195229 A1 | 8/2006 | Bell | |
| 2007/0162189 A1 | 7/2007 | Huff | |
| 2007/0168088 A1 | 7/2007 | Ewing | |
| 2007/0219755 A1 | 9/2007 | Williams | |
| 2007/0239372 A1 | 10/2007 | Schweitzer | |
| 2007/0239373 A1 | 10/2007 | Nasle | |
| 2008/0074810 A1 | 3/2008 | Guzman-Casillas | |
| 2009/0076661 A1 | 3/2009 | Pearson | |
| 2009/0204245 A1 | 8/2009 | Sustaeta | |
| 2010/0013632 A1 | 1/2010 | Salewske | |
| 2010/0204844 A1 | 8/2010 | Rettger | |
| 2010/0312414 A1 | 12/2010 | Kumar | |
| 2011/0004425 A1 | 1/2011 | Schweitzer | |
| 2011/0022245 A1 | 1/2011 | Goodrum | |
| 2011/0054709 A1 | 3/2011 | Son | |
| 2011/0066301 A1 | 3/2011 | Donolo | |
| 2011/0320058 A1 | 12/2011 | Rietmann | |
| 2012/0123602 A1 | 5/2012 | Sun | |
| 2012/0232710 A1 | 9/2012 | Warner | |
| 2012/0310434 A1 | 12/2012 | Taft | |
| 2012/0331082 A1 | 12/2012 | Smith | |
| 2013/0035885 A1 | 2/2013 | Sharon | |
| 2013/0074513 A1 | 3/2013 | Mueller | |
| 2013/0088239 A1 | 4/2013 | Mynam | |
| 2013/0138260 A1 | 5/2013 | Varentec | |
| 2013/0166085 A1 | 6/2013 | Cherian | |
| 2014/0001847 A1 | 1/2014 | Khandelwal | |
| 2015/0241894 A1 | 8/2015 | Bartlett | |
| 2015/0244170 A1 | 8/2015 | Bartlett | |
| 2015/0244171 A1 | 8/2015 | Bartlett | |

OTHER PUBLICATIONS

Qun Debbie Zhou, "Online Voltage Stability Prediction and Control Using Computational Intelligence Technique," In Doctoral dissertation, The University of Manitoba, Sep. 21, 2010.

Kai Sun, Da-Zhong Zheng and Qiang Lu, "Splitting Strategies for Islanding Operation of Large-Scale Power Systems Using OBDD-based methods," in IEEE Transactions on Power Systems, vol. 18, No. 2, pp. 912-923, May 2003.

Mark Grant, "Foxboro SCADA Systems Load Shedding and Electrical Monitoring Control Systems Design in Industrial Process Plants", 2012, retrieved on May 5, 2016 from http://iom.invensys.com/EN/pdfLibrary/WhitePaper_LoadSheddingandElectricalMonitoring.pdf.

* cited by examiner

DETECTION AND REMEDIATION OF TRANSIENTS IN ELECTRIC POWER SYSTEMS

RELATED APPLICATION (None)

TECHNICAL FIELD

This disclosure relates to systems and methods for detection of transients in electric power systems. In response to detection of a potentially destabilizing transient condition, a remedial action may be implemented to restore stability.

Non-limiting and non-exhaustive embodiments of the disclosure are described, including various embodiments of the disclosure with reference to the figures included in the detailed description.

DETAILED DESCRIPTION

Figure 1:
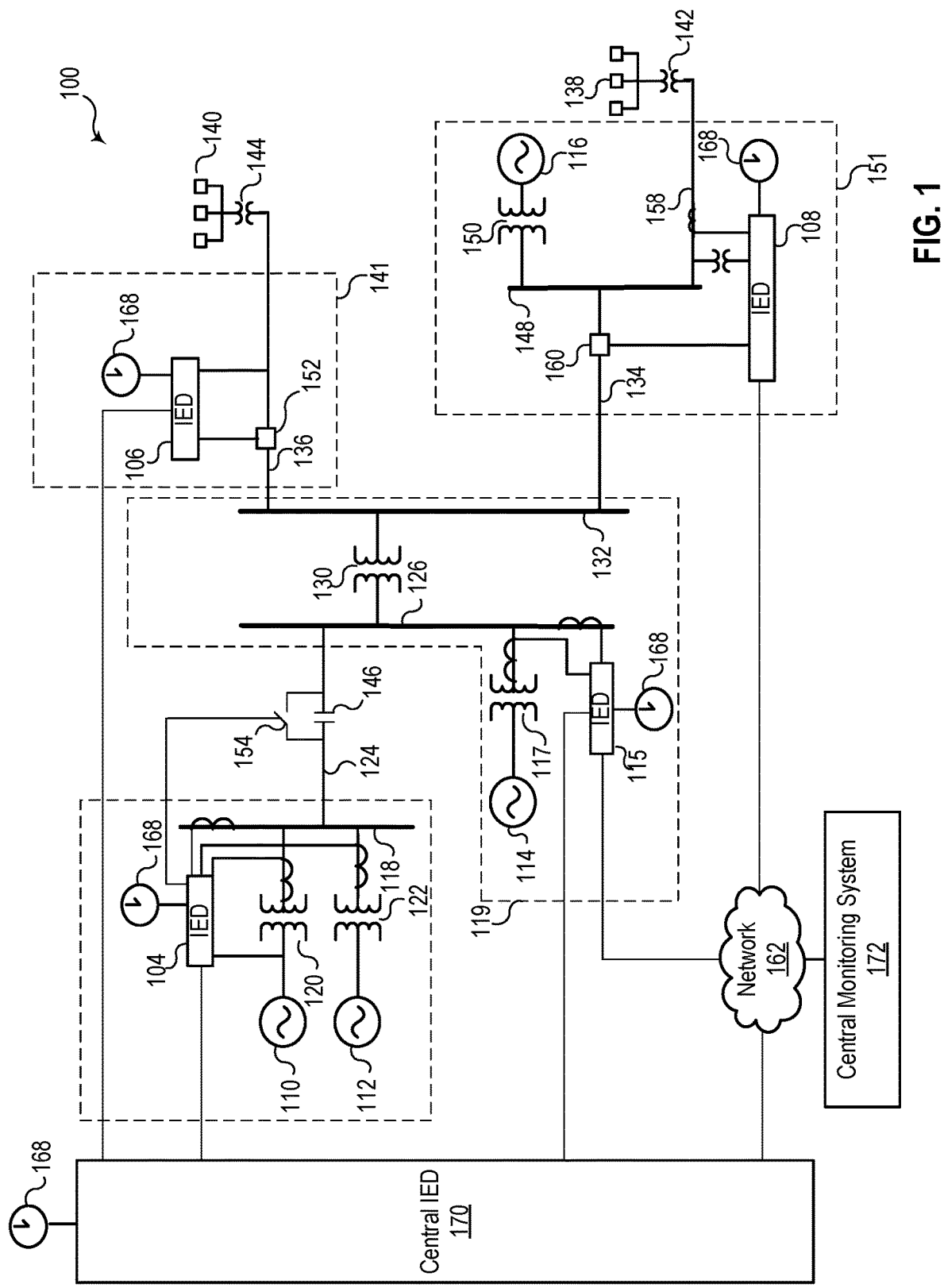
FIG. 1 illustrates a simplified one-line diagram of an electric power transmission and distribution system configured to detect an out-of-step predictive remedial engine consistent with embodiments of the present disclosure.

Certain events or conditions in the power system may introduce a potentially destabilizing transient condition. Such events or conditions may cause rotating machinery (e.g., generators, motors, etc.) to go out-of-step with each other (i.e., lose synchronism) resulting in damage to the machines. In various embodiments consistent with the present disclosure, an Out-of-Step Predictive Remedial System (OoSPRS) may analyze power system measurements, determine if a potentially destabilizing transient condition has been initiated, and identify necessary remedial action required to direct the transient behavior towards stability.

Certain algorithms intended to detect potentially destabilizing transient conditions and to protect monitored equipment may rely on estimated impedance values of protected equipment; however, certain events are initiated by or result in sudden changes in these impedance values. Such changes may include, but are not specifically limited to addition or removal of parallel transmission lines from service, insertion or removal of series capacitance, tap changes on phase adjusting transformers, changes in loads at line taps between the measurement points, and the like. These changes may undermine the effectiveness of such algorithms.

In various embodiments consistent with the present disclosure, an angle of rotating machines at both ends of a power path may be monitored. Monitoring an angle difference across a power path between two devices may avoid the reliance on impedance estimates of the path between the two devices. Accordingly, in various embodiments of the present disclosure, measurements may be made at both ends of a power path (e.g., one or more transmission lines) may be monitored, and time-synchronized measurements from both ends of the power path may be compared to determine an angle difference. In other embodiments, single-ended measurements may be used along with other, and in some cases redundant techniques to ensure that potentially destabilizing transient conditions are accurately detected without regard to the effect of such events on the impedance of affected components.

Using measurements of an angle between two nodes in a power system, systems and methods consistent with the present disclosure may calculate values for an angle (delta or $\delta$), a first derivative of the angle (slip or $d\delta/dt$), and a second derivative of the angle (acceleration or $d^2\delta/dt^2$). In some embodiments, prior values of the angle, slip, and/or acceleration within a window of time may be used. Scaling factors may be calculated using delta, slip, acceleration, or a combination of the three values. The scaling factors may be utilized to calculate a dynamic stability function.

A dynamic stability function, as opposed to a static stability function, may provide improved protection and utilization of an electric power system. Parameters affecting the stability of an electric power system may vary over time; however, static stability functions are commonly used for protection systems. Depending on conditions in the system, a static stability function may be over-protective, thus unduly constraining operation of the power system, or may be under-protective, thus risking damage to equipment in the system. In contrast, dynamic adjustments to the stability function and associated protection thresholds may improve protection and permit the system to avoid overly restrictive protective actions.

Once an event or condition indicative of instability is detected, various systems and methods consistent with the present disclosure may implement a remedial action based on a predicted response of the system prior to and/or during a remedial action. Prediction of the system response may permit the system to compensate for time delay and/or to customize the remedial action to avoid unnecessary protective actions. Some protection algorithms may have a reduced restraint region to account for time delays associated with enacting a remedial action. Determining a restraint region that includes a fixed time delay may increase the likelihood of unnecessary protective action. In contrast, the dynamic systems and methods disclosed herein may be used in connection with a predicted response of the system to compensate for a remedial action delay. If the state is predicted to exceed the restraint region boundary, the remedial action can be triggered at a sufficiently early point in time that will overcome the delays described above.

Still further, the predicted response of the system experiencing a potentially destabilizing transient condition may be used to determine an appropriate remedial action. A typical response to an out-of-step condition is electrically separating the out-of-step component; however, less drastic remedial measures may be employed depending on the dynamic conditions. Various remedial measures short of electrical separation may include a generator set point adjustment (e.g., re-dispatch or runback), insertion of series capacitance, or load modification (e.g., load shedding, insertion of a dynamic brake, etc.). Calculation of a minimum required path unloading value to maintain stability may permit systems and methods consistent with the present disclosure to determine an appropriate adjustment (e.g., changes to the power system generation and/or load) to restore stability without electrically separating the system.

Finally, the predicted response of the system may be used while monitoring the response of the system to the remedial action to determine if adjustments to the remedial action are necessary. In the event that further instability arises during the remedial action, the remedial action may be modified to address the instability based on a predicted response of the system to dynamic changes.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates a simplified one-line diagram of an electric power transmission and distribution system 100 consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission lines (e.g., 124) and delivery lines (e.g., lines 134, 136, and 158), circuit breakers (e.g., breakers 152, 160), busses (e.g., busses 118, 126, 132, and 148), loads (e.g., loads 140, and 138) and the like. Transmission line 124 may be a series-compensated transmission line, including a reactive power element 146 that may be selectively connected or disconnected to provide reactive power support under appropriate conditions. A switch 154 controlled by IED 104 may be used to bypass the reactive power element 146. The opening and/or closing of switch 154 may case a step change in the effective impedance of transmission line 124. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

In various embodiments, IEDs 104, 106, 108, 115, and 170 may be configured to monitor the frequency of alternating current waveforms in system 100. The measurements may be used in connection with the systems and methods disclosed herein for control of system 100. The IEDs may utilize common time source 168 to time-align measurements for comparison across system 100.

Network 162 may be used to transmit information among various components in system 100, including IEDs 108, 115, 170, and central monitoring system 172. In various embodiments, network 162 may be configured to provide streaming measurements that may be analyzed consistent with the present disclosure to detect anomalies.

One or more of IEDs 104, 106, 108, 115 and/or 170 may be configured to analyze power system measurements to determine if a potentially destabilizing transient condition has been detected. The IEDs may determine an appropriate action when a potentially destabilizing transient condition has occurred and identify necessary action required to direct the transient behavior towards stability. In the illustrated embodiment, a transmission line 124 may separate generators 110 and 112 from generator 114. IED 104 may be configured to monitor electrical currents and voltages associated with generators 110 and 112 and create time-synchronized measurements of those values. These values may be communicated to central IED 170, which may also receive time-synchronized measurements reflecting electrical currents and voltages associated with generator 114. Central IED 170 and/or central monitoring system 172, may analyze the measurements of electrical conditions associated with generators 110, 112, and 114 to detect an out-of-step condition and/or other conditions that may lead to instability in system 100.

Figure 2A:
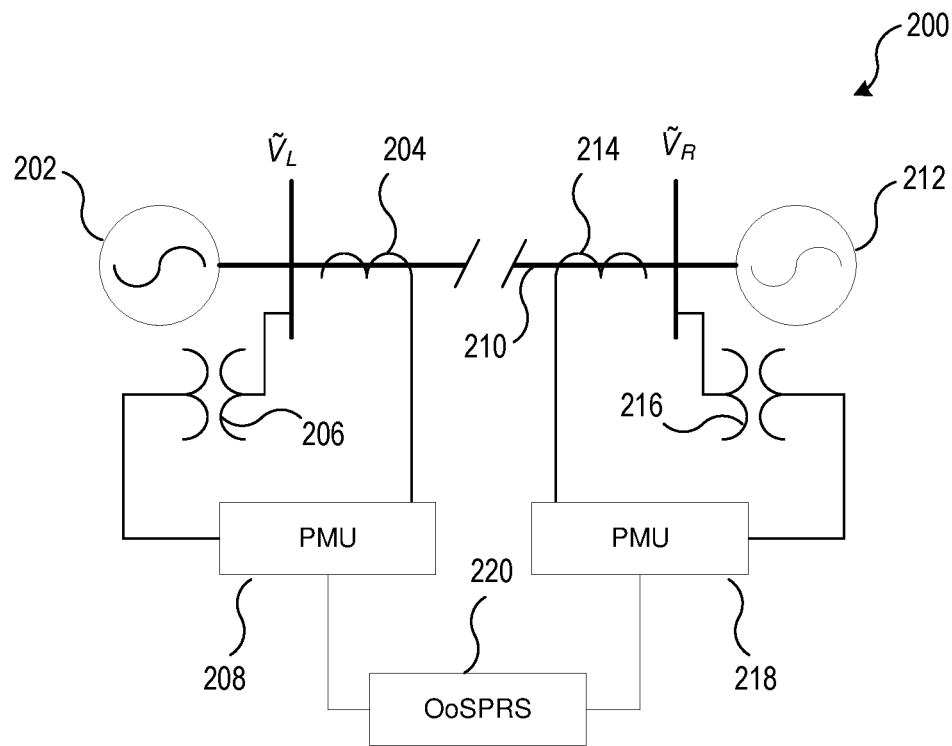
FIG. 2A illustrates a simplified one-line diagram of an electric transmission and distribution system and functional block diagram of a system configured to detect and resolve a potentially destabilizing transient condition consistent with embodiments of the present disclosure.

FIG. 2A illustrates a simplified one-line diagram of an electric transmission and distribution system and functional block diagram of a system 200 configured to detect and resolve a potentially destabilizing transient condition consistent with embodiments of the present disclosure. In the illustrated embodiment, two generators 202, 212 are connected by a transmission line 210. Phasor-measurement units (PMU) 208, 218 are configured to obtain voltage measurements using voltage transformers 206, 216 and to obtain current measurements using current transformers 204, 214. PMUs 208, 218 may be connected to OoSPRS 220 and may provide the voltage and current phasor measurements to OoSPRS 220.

OoSPRS 220 may analyze the voltage and current phasor measurements to detect a potentially destabilizing transient condition that could result in a loss of synchronism between the generators 202, 212. In various embodiments consistent with the present disclosure, an angle of the generators 202, 212 may be determined at both ends of transmission line 210. Transmission line 210 may represent a set of transmission lines connecting a generator to the rest of the grid, a set of transmission lines connecting two separate collections of machines (e.g., two cities), or any other configuration where a local machine or grouping of machines is separated from a remote machine or grouping of machines by a transmission network.

Using the present angle measurements associated with the generators 202, 212, OoSPRS 220 may calculate various parameters associated with the angle, such as the difference between the angles (delta), the first derivative of the angle (slip), and the second derivative of the angle (acceleration). In some embodiments, smoothed or averaged values over a period of time may be determined based on prior values of delta, slip, and acceleration over a specified window of time. The values of delta, slip and acceleration may be used to determine scaling factors.

The scaling factors may be utilized to calculate a function reflecting the stability of the system 200. OoSPRS 220 may monitor the electric power system 200 for events that could lead to instability in the system and/or for conditions that could lead to instability. Once an event or condition indicative of instability is detected, OoSPRS 220 may predict the response of the system 200 to a remedial action. The response of the system 200 to the remedial action may be monitored until the event is concluded. In the event that further instability arises during the remedial action, the remedial action may be modified to address the instability.

Figure 2B:
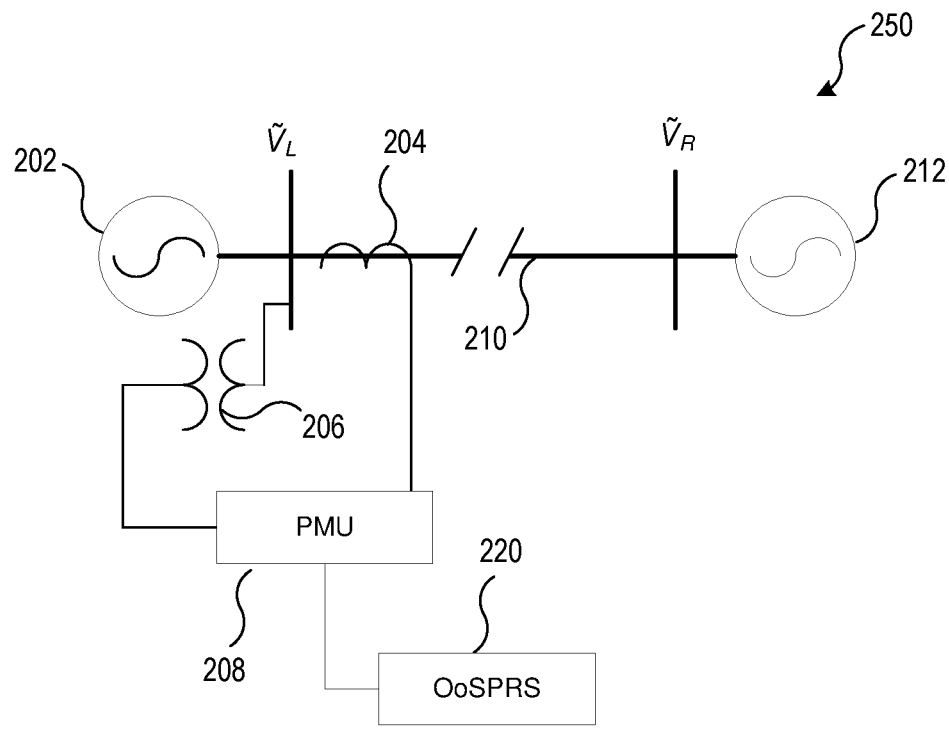
FIG. 2B illustrates an alternate configuration of a simplified one-line diagram of an electric transmission and distribution system and functional block diagram of a system configured to detect and resolve a potentially destabilizing transient condition.

FIG. 2B illustrates an alternate configuration of a simplified one-line diagram of an electric transmission and distribution system and functional block diagram of a system configured to detect and resolve a potentially destabilizing transient condition. As illustrated by comparison of system 200 (shown in FIG. 2A) and system 250 (shown in FIG. 2B), system 250 lacks a PMU configured to directly monitor the output of generator 212. Nonetheless, the systems and methods disclosed herein may be adapted using various techniques to detect a potentially destabilizing transient condition that could result in a loss of synchronism between the generators 202, 212. For example, the angle between the generators 202, 212, may be approximated based on voltage and currents from one generator 202, and estimates of the transient reactances of both generators 202, 212 and the impedance from the transmission line 210.

Systems 200 and 250 may be configured to calculate thresholds for event detection. In one specific embodiment, OoSPRS 220 may calculate a slip scaling factor, a, based on the steady-state value of delta and a ratio of the maximum restoring torque that the system (τ) and the equivalent system rotational inertia (J), as shown in Eq. 1. An acceleration scaling factor, b, relates a maximum allowable acceleration for a marginally stable transient, as shown in Eq. 2.

$$a = \sqrt{2\frac{\tau_{Max}}{J}} \sqrt{\cos(\delta_{EqF}) - \cos(\delta_i) + (\delta_{EqF} - \delta_i)\sin(\delta_{EqF})} \quad \text{Eq. 1}$$

$$b = \left(\frac{\tau_{Max}}{J}\right)(\sin(\delta_{EqF}) - \sin(\delta_i)) \quad \text{Eq. 2}$$

In Eq. 1, $\delta_i$ corresponds to an angle prior to an initiating event and $\delta_{EqF}$ corresponds to the angle after the initiating event. The values of scaling factors a and b may be used to define an ellipse defined by Eq. 3a.

$$r^2 = \left(\frac{\delta}{a}\right)^2 + \left(\frac{\dot{\delta}}{b}\right)^2 \quad \text{Eq. 3a}$$

Alternate definitions for the ellipse is defined in Eq. 3b and Eq. 3c may be employed separately or in combination with Eq. 3a during the transient to identify event conclusion. Using the relationship that $$\ddot{\delta} \approx \left(\frac{\tau}{J}\right)(\delta_{E_q} - \delta),$$

the ellipse can be defined as:

$$r^2 = \left(\frac{\delta}{a}\right)^2 + \left(\frac{\ddot{\delta} \cdot \left(\frac{\tau}{J}\right) \cdot (\delta_{E_q} - \delta)}{b^2}\right) \quad \text{Eq. 3b}$$

$$r^2 = \left(\frac{\delta}{a}\right)^2 + \left(\frac{\left(\frac{\tau}{J}\right) \cdot (\delta_{E_q} - \delta)}{b}\right)^2 \quad \text{Eq. 3c}$$

A value of r=1 indicates a condition that is marginally stable (i.e., the largest allowable transient that does not cause instability).

In another specific embodiment, OoSPRS 220 may calculate a slip scaling factor, a, based on the steady-state value of delta and a ratio of the maximum restoring torque that the system (τ) and the equivalent system rotational inertia (J), as shown in Eq. 1 only. This scaling factor, a, represents a Lyapunov stability threshold related to the sum of the kinetic and potential synchronizing energy of the transient. In Eq. 1, $\delta_i$ corresponds to an angle prior to an initiating event, $\delta_{MEM}$ is a smoothed versions of δ, and $\delta_{EqF}$ corresponds to the post transient equilibrium angle. The values of scaling factor a may be used to define a circle defined by Eq. 3d used for detecting event initiation whereas the circle defined by Eq. 3e may be used to identify when the event is concluded.

$$r^2 = \frac{1}{a^2}\left(\dot{\delta}^2 + \frac{\tau}{J}(\cos(\delta_{MEM}) - \cos(\delta))\right) \quad \text{Eq. 3d}$$

$$r^2 = \frac{1}{a^2}\left(\dot{\delta}^2 + \text{abs}\left(\frac{\tau}{J}(\cos(\delta_{Eq}) - \cos(\delta))\right)\right) \quad \text{Eq. 3e}$$

Under steady state conditions, r should be approximately equal to 0. In various embodiments, the OoSPRS 220 may determine that an event has occurred whenever the value of r exceeds a specified threshold. In one specific example, the threshold may be established at 10% of the largest allowable transient that does not cause instability, such that OoSPRS 220 identifies that an event has occurred whenever r>10%. In some embodiments, the OoSPRS 220 may utilize various techniques to calculate the trip thresholds.

Transients capable of causing instability may be the result of sharp changes to either the system parameters τ or J. Accordingly, restraint or trip thresholds based on these values may be unreliable. In order to address this issue, various embodiments consistent with the present disclosure may monitor for instability in multiple ways. In one embodiment, OoSPRS 220 may assess system stability using the system parameters τ or J, and may simultaneously assess system stability using criteria that are not dependent on τ or J. In various embodiments, the equal area criterion for power system transient stability, which is discussed in greater detail in connection with FIG. 3, may be used to assess system stability.

Figure 3:
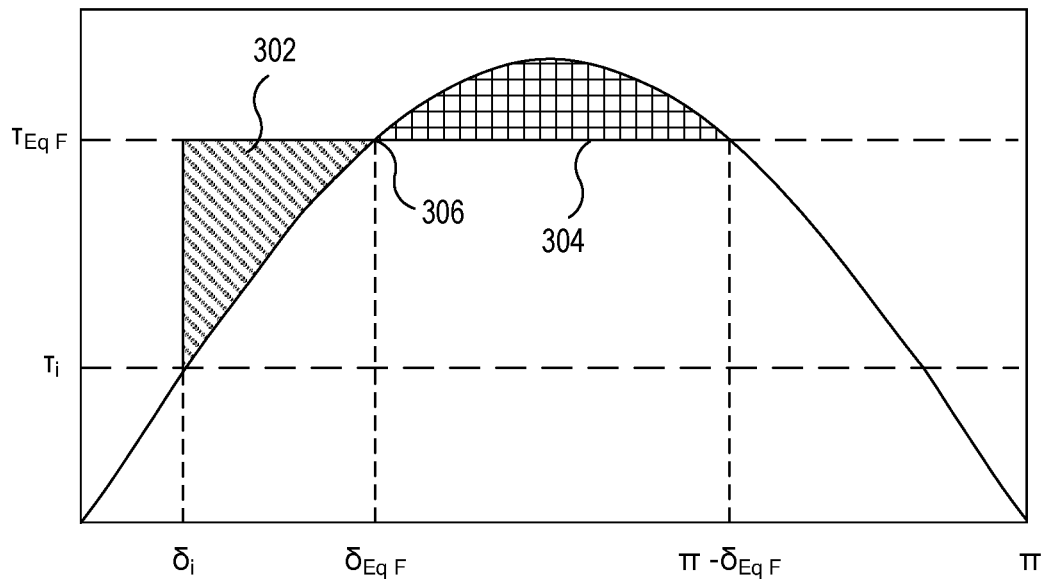
FIG. 3 illustrates a plot showing an equal area criterion for power system transient stability consistent with embodiments of the present disclosure.

FIG. 3 illustrates a plot showing an equal area criterion for power system transient stability consistent with embodiments of the present disclosure. When an initiating event occurs, the equilibrium angle shifts from $\delta_i$ (initial angle) to $\delta_{EqF}$ (new equilibrium angle). During the outgoing swing of the transient, region 302 indicates an area where the system is accelerating, and region 304 indicates an area where the system is decelerating. Point 306 is where the acceleration is zero. At point 306, a ratio of τ/J can be calculated from the closed form expression shown in Eq. 4.

$$\left(\frac{\tau_{Max}}{J}\right)_{Update} = \frac{\delta_M^2 / 2}{\cos(\delta_M) - \cos(\delta_i) + \sin(\delta_M)(\delta_M - \delta_i)} \quad \text{Eq. 4}$$

Where $\delta_M$ is the measured value of delta and $\dot{\delta}_M$ is the measured value of slip when the acceleration is zero. This method will produce a result as long as the acceleration drops to zero at some point in the initial portion of the transient.

If the acceleration has not yet dropped to zero OoSPRS 200 may still estimate a value of τ/J by performing a non-linear optimization using several measurements of delta, slip, and acceleration. The measurements of delta, slip, and acceleration may be related to calculations of the kinetic energy, acceleration, and dynamic equations of motion, expressions f(k), g(k), and h(k) respectively defined in Eq. 5. This method has the benefit of estimating values for not only τ/J, but also the pre-transient initial angle $\delta_i$, and the new equilibrium angle $\delta_{Eq}$. This method has difficulties in that it may be numerically unstable and so Method 1 is retained as a backup if this method fails to converge. In one specific embodiment, Eq. 5 may be used to perform the non-linear optimization.

$$\dot{\delta}_{calc}^2 : f(k) = 2c((\delta_M(k) - \delta_i)S + \cos(\delta_M(k)) - \cos(\delta_i))$$

$$\ddot{\delta}_{calc}^2 : g(k) = c(S - \sin(\delta_M(k)))$$

$$\dot{\delta}_{predict} : h(k) = c(S - \sin(\delta_M(k-1)))*T_s + \dot{\delta}_M(k-1) \quad \text{Eq. 5}$$

Where c represents $\tau/J$ and S represents the sin of $\delta_{Eq}$
A Newton-Raphson minimization may be performed using the iteration shown in Eq. 6.

$$\left( \begin{bmatrix} f(1) \\ \vdots \\ f(n) \\ g(1) \\ \vdots \\ g(n) \\ h(2) \\ \vdots \\ h(n) \end{bmatrix} - \begin{bmatrix} \dot{\delta}_M^2(1) \\ \vdots \\ \dot{\delta}_M^2(n) \\ \ddot{\delta}_M(1) \\ \vdots \\ \ddot{\delta}_M(n) \\ \delta_M(2) \\ \vdots \\ \delta_M(n) \end{bmatrix} \right) = \begin{bmatrix} \frac{\partial}{\partial c}f(1) & \frac{\partial}{\partial \delta_i}f(1) & \frac{\partial}{\partial S}f(1) \\ \vdots & \vdots & \vdots \\ \frac{\partial}{\partial c}f(n) & \frac{\partial}{\partial \delta_i}f(n) & \frac{\partial}{\partial S}f(n) \\ \frac{\partial}{\partial c}g(1) & \frac{\partial}{\partial \delta_i}g(1) & \frac{\partial}{\partial S}g(1) \\ \vdots & \vdots & \vdots \\ \frac{\partial}{\partial c}g(n) & \frac{\partial}{\partial \delta_i}g(n) & \frac{\partial}{\partial S}g(n) \\ \frac{\partial}{\partial c}h(2) & \frac{\partial}{\partial \delta_i}h(2) & \frac{\partial}{\partial S}h(2) \\ \vdots & \vdots & \vdots \\ \frac{\partial}{\partial c}h(n) & \frac{\partial}{\partial \delta_i}h(n) & \frac{\partial}{\partial S}h(n) \end{bmatrix} \left( \Delta \begin{bmatrix} c \\ \delta_i \\ S \end{bmatrix} \right) \quad \text{Eq. 6}$$

While collecting data for the parameter estimation described using Eqs. 4 and 5, OoSPRS 220 may monitor the angle (delta) and the system parameters (slip and acceleration) for instability evidence that is not dependent on $\tau$ or J. This independent trip criterion may be triggered if OoSPRS 220 identifies that the system is continuing to accelerate past the point where a stable transient should be decelerating.

In some embodiments, a system may implement this trip criterion when the system is observed to be accelerating in the outbound direction when the angle is measured at 90 degrees or greater. Since 90 degrees is the maximum possible torque point, if the system is still accelerating when the angle is measured at 90 degrees, the system is demanding more torque (or equivalently stated, more power) than the system can provide under steady state conditions and therefore the transient cannot be stable.

In other embodiments, a system may implement this trip criterion based on an estimate of the critical equilibrium angle ($\delta_{Eq-crit}$) from the initial angle ($\delta_i$) and trip when the system is observed to be accelerating in the outbound direction while the angle is measured at this equilibrium angle or greater. When the required torque (i.e., area 302 in FIG. 3) is greater than the maximum possible stabilizing torque (i.e., area 304 in FIG. 3), the system will become unstable. A continued acceleration when $\delta > \delta_{Eq-crit}$ is an indication of this condition. Stated in other terms, the maximum transient outswing acceleration may be bound by an upper limit. If the maximum transient outswing acceleration remains below the upper limit, the system may remain stable. In some embodiments, the upper limit for the transient outswing acceleration may be 90 degrees, while in other embodiments, the upper limit may be based on an estimated critical equilibrium angle, $\delta_{Eq-crit}$.

The calculation of $\delta_{Eq-crit}$ from $\delta_i$ (the pre-event value of $\delta$) may be performed via an iterative solution to a nonlinear equation relating the critical values of destabilizing conditions (i.e., area 302 in FIG. 3) and stabilizing conditions (i.e., area 304 in FIG. 3). The iterative solution may be performed via a Newton-Raphson optimization, or may be approximated using a 3rd order polynomial fit. In practice, the polynomial fit may be performed to calculate an initial estimate for $\delta_{Eq-crit}$, then one or more correction iterations may be performed using the nonlinear optimization to refine the estimate. The polynomial fit shown in Eq. 7 defines the relationship between $\delta_{Eq-crit}$ and $\delta_i$ when both are expressed in radians and is accurate to within 0.05 degrees over the range of $\delta_i=0$ to $\pi/2$, and accordingly few, if any, correction steps may be required.

$$\delta_{Eq-Crit}(\delta) = -0.0084\delta^3 + 0.0341\delta^2 + 0.0341\delta + 0.8099 \quad \text{Eq. 7}$$

Using the dynamic equations relating delta, slip, and acceleration, the OoSPRS 220 may numerically predict the system state. OoSPRS 220 may predict the state in the future consistent with the delay between initiating a remedial action and when that remedial action takes effect. Therefore, a decision made based on the predicted state can be triggered now and effectively enacted on the system at the point in the actual transient where it was simulated to take effect. This predication may enable OoSPRS 220 to use of slower acting remedial actions such as generator runback, or selective load shedding.

Figure 4:
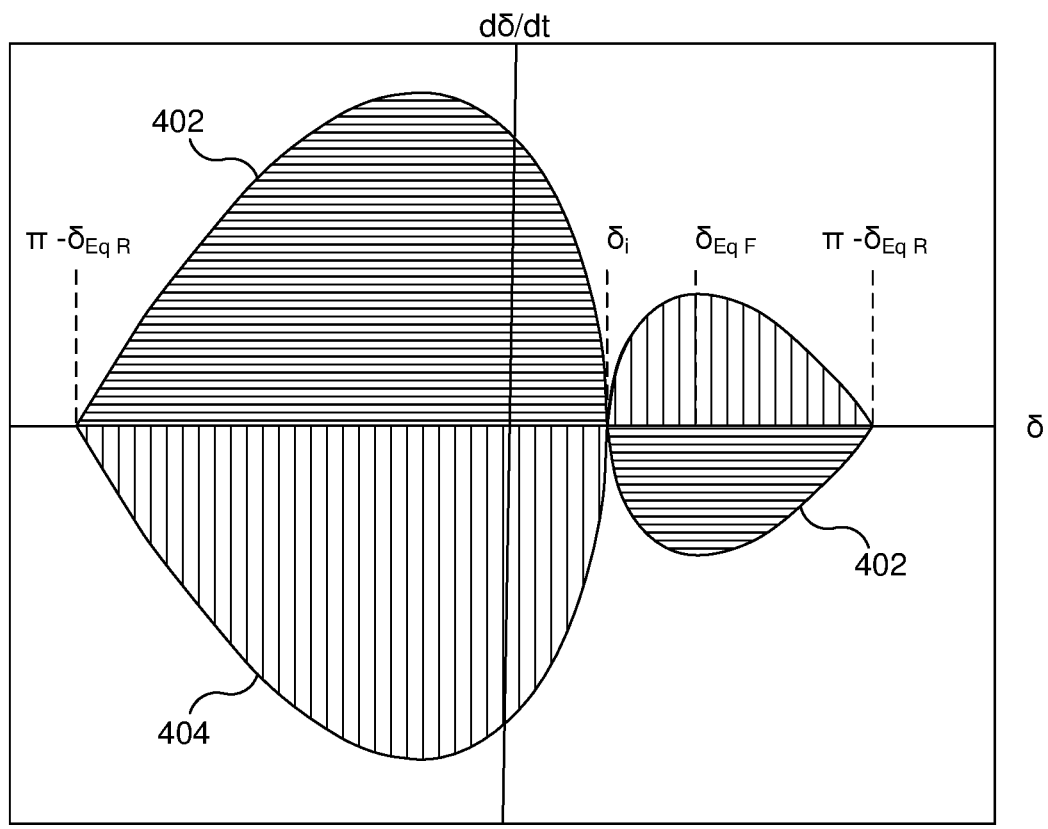
FIG. 4 illustrates a plot of a region defined on the delta-slip plane corresponding to the marginally stable transients in both the forward and reverse direction consistent with embodiments of the present disclosure.

FIG. 4 illustrates a plot of a region defined on the delta-slip plane ($\delta$–$\dot\delta$ plane) corresponding to the marginally stable transients in both the forward ($\delta=\delta_i$ to $\pi-\delta_{Eq-F}$) and reverse ($\delta=-\pi+\delta_{Eq-R}$ to $\delta_i$) direction consistent with embodiments of the present disclosure. The forward region is defined by Eq. 8.

$$\dot\delta(\delta) = \sqrt{2\frac{\tau_{Max}}{J}} \sqrt{\cos(\delta) - \cos(\pi - \delta_{Eq-F}) - \sin(\delta_{EqF})((\pi - \delta_{EqF}) - \delta)} \quad \text{Eq. 8}$$

Eq. 8 may be derived by equating the integration of the torque curves (areas 302 and 304 in FIG. 3) with the kinetic energy of the system 200 at each point during the marginally stable transient. The region 404 identified by vertical lines may correspond to an outward swing of a transient and where instability may be detected. The region 402 identified by horizontal lines may correspond to a return swing of a transient. Since this method is based on an estimate for the ratio of $\tau/J$, a second criterion is used to validate a trip determination. This second criterion may use the marginally stable transient, but related slip to acceleration. The kinetic energy of the system is directly related to slip, and the potential energy is indirectly related to acceleration. The total system transient energy can then be calculated from these values and compared to the total energy of the marginally stable transient.

Figure 5:
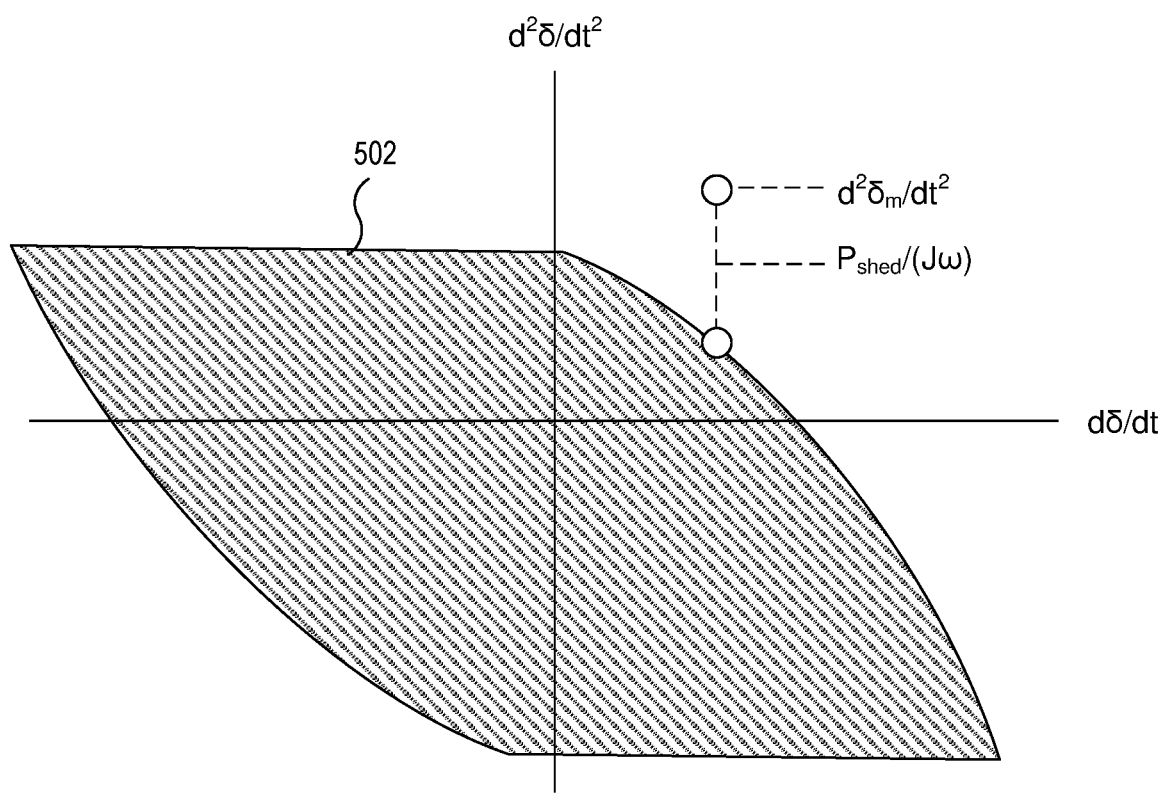
FIG. 5 illustrates a plot of a restraint region as a function of slip and acceleration consistent with embodiments of the present disclosure. While monitoring the response of a system to a remedial action taken to remedy an oscillatory transient, an OoSPRS may continue to calculate the ellipsoid radius value described in Eq. 3.

FIG. 5 illustrates a plot of a restraint region 502 as a function of slip and acceleration consistent with embodiments of the present disclosure. While monitoring the response of a system to a remedial action taken to remedy an oscillatory transient, an OoSPRS may continue to calculate the ellipsoid radius value described in Eq. 3. In response to the remedial action, the value of r would be expected to decay in a predominantly monotonic manner—some ripple may be expected if the values of a and b contain errors. A rapid increase in the value of r may indicate that a new event has occurred and may trigger OoSPRS to reset its tracking algorithm to handle the subsequent transient event. In some embodiments, an increase by a factor of 3 in the value of r may trigger tracking of a new potentially destabilizing transient condition. The restraint region 502 may be calculated from the present value of delta. As delta becomes more positive, the region shifts down and to the left. Conversely, a negative delta shifts the region up and to the right. If both these criteria show that the system state is outside of what would be expected for the marginally stable transient, the system will identify this as a potentially destabilizing transient condition.

In various embodiments, an event may be identified as concluded if the value of r reduces to less than a threshold value of the critical ellipsoid radius. In some embodiments, the threshold may be 5% of the ellipsoid radius. The 5% value may be chosen to provide hysteresis by being half the value of the threshold used to trigger a new event. On the other hand, if a potentially destabilizing transient condition arises while remedial action is in progress, an OoSPRS may analyze the second criterion to determine by how much the acceleration exceeds the acceleration of the marginally stable transient. This excess acceleration may be proportional to the excess torque (or power) demand across the path as shown in Eq. 9. From this value, a remedial action scheme can determine the appropriate remedial action to execute, such as an amount of load necessary to shed ($P_{shed}$) to reduce the power required by the system and restore stability.

$$\delta_{Eq-crit} = \text{find } \delta_{Eq} \text{ where} \qquad \text{Eq. 9}$$

$$0 = \frac{1}{2}J(\dot{\delta}_M)^2 - \tau_{Max}\int_{\delta_M}^{\pi-\delta_{Eq}}(\sin(\delta_{Eq}) - \sin(x)))dx$$

$$\ddot{\delta}_{crit} = \frac{\tau_{Max}}{J}(\sin(\delta_{Eq-crit}) - \sin(\delta_M))$$

$$P_{Shed} = J(\ddot{\delta}_M - \ddot{\delta}_{crit})$$

Figure 6A:
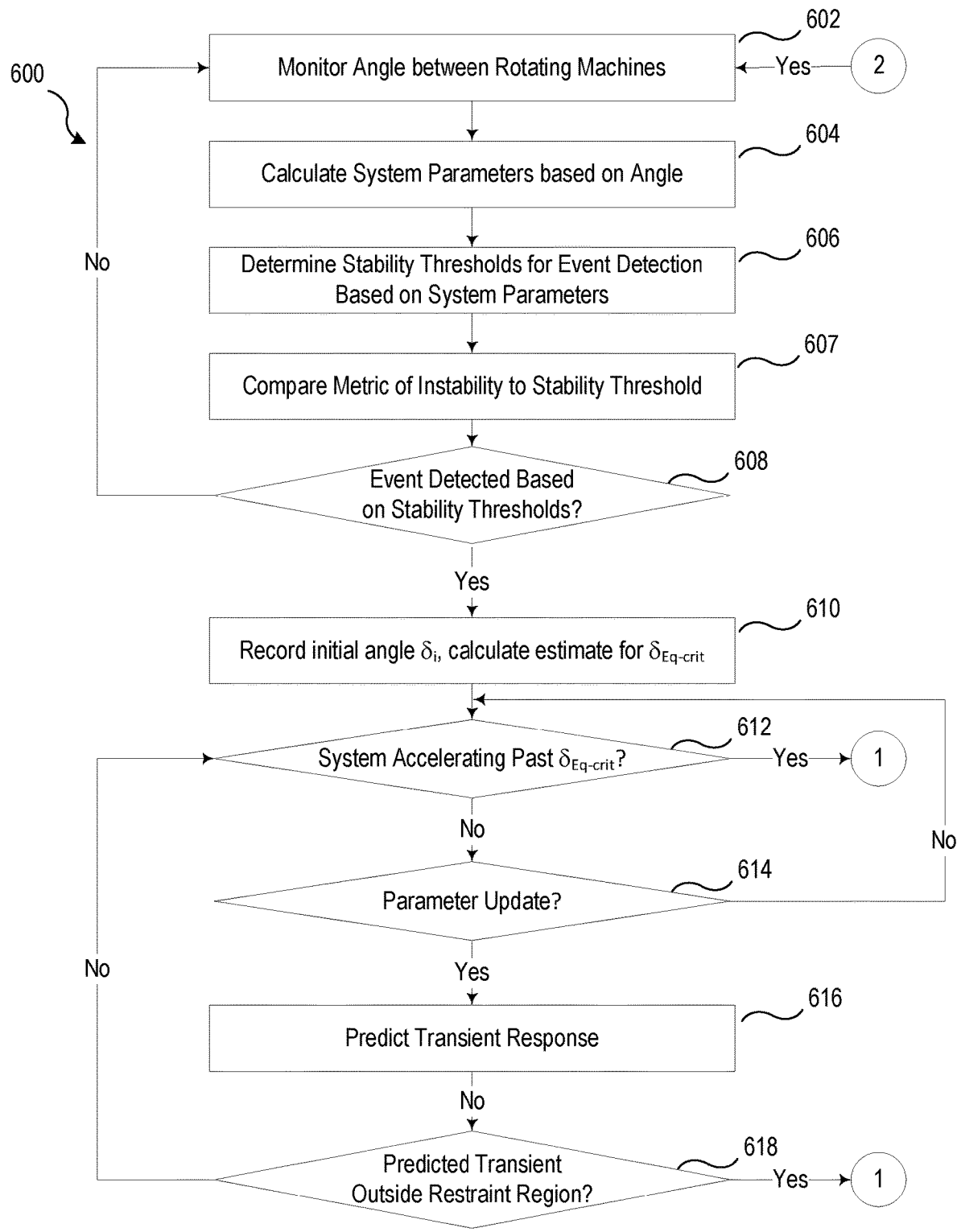
FIG. 6A illustrates a first part of a flow chart of one embodiment of a method for detecting and remediating a potentially destabilizing transient condition consistent with embodiments of the present disclosure.
Figure 6B:
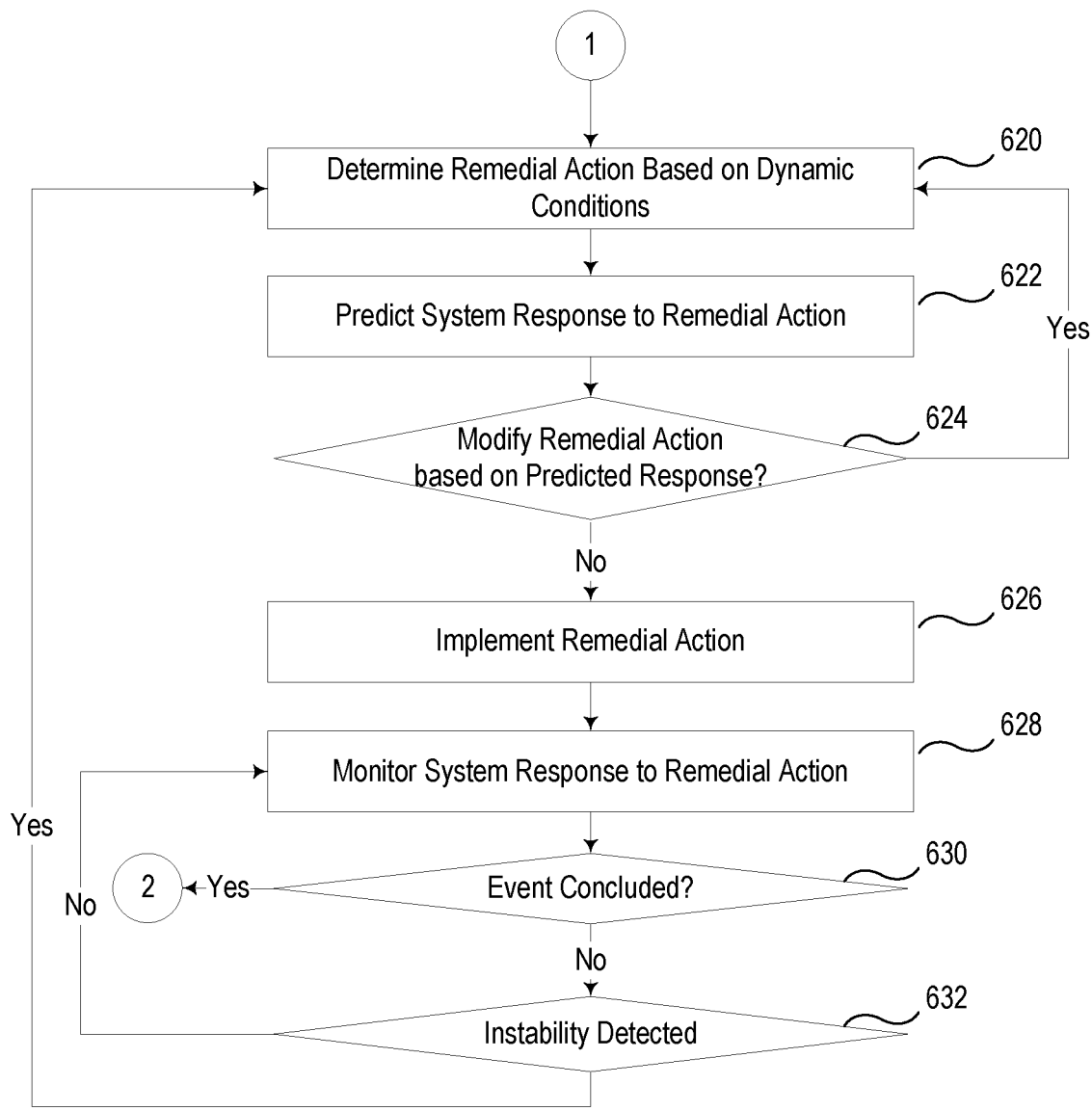
FIG. 6B illustrates a second part of the flow chart of FIG. 6A consistent with embodiments of the present disclosure.

FIGS. 6A and 6B illustrate a flow chart of one embodiment of a method 600 for detecting and remediating a potentially destabilizing transient condition consistent with embodiments of the present disclosure. At 602, an angle between rotating machines may be monitored. In various embodiments, the angle may be determined by separate devices at opposite ends of a power path. The measurements may be time-stamped measurements (e.g., synchrophasors), to facilitate analysis of the measurements.

At 604, an estimate for the system parameter $\tau_{max}$ may be calculated across a transmission path based on the voltage angle across the path $\delta$, voltages, and currents as shown in Eq. 10 where $\varphi$ is the angle between voltage and current and $\omega$ is the system frequency. This estimate of $\tau_{Max}$ can be used at 606 to calculate stability thresholds.

$$\tau_{Max} = |V|*|I|*\frac{\cos(\varphi)}{\omega\sin(\delta)} \qquad \text{Eq. 10}$$

At 607, method 600 may compare a metric of instability to a stability threshold. In one embodiment, the metric of instability may be the value r, calculated using Eq. 3. Under steady state conditions, r should be approximately equal to 0. In one specific example, the stability threshold may be established at 10% of the largest allowable transient that does not cause instability. In other embodiments, other stability metrics and stability thresholds may be utilized.

At 608, method 600 may determine whether a potentially destabilizing condition is detected based on the stability thresholds. Once a potentially destabilizing event is detected, method 600 records the initial angle of the transient at 610 and calculates an estimate for the associated critical equilibrium angle.

At 612, the system actively monitors the acceleration and angle to perform an initial assessment of stability independent of the $\tau/J$ parameter. In one embodiment, such a method may comprise determining that the system is accelerating in the outbound direction past the critical equilibrium angle (i.e., the point where $\delta > \delta_{Eq-crit}$). Since a stable transient must stop accelerating at or before the critical equilibrium angle, a system that is observed to be still accelerating at this point will become unstable. If instability is identified, remedial actions are evaluated at 620, otherwise online parameter estimation is performed at 614.

At 616, a plurality of measurements for angle, slip, and velocity are employed to update the value for the $\tau/J$ parameter before stability criteria that rely on $\tau/J$ may be effectively employed. One embodiment might use a closed form calculation for $\tau/J$ when the acceleration is zero, as described in Eq. 4. Another embodiment might use an iterative nonlinear solution method, such as Newton-Raphson minimization, to solve the system of equations described in Eqs. 5 and 6. This method estimates not only $\tau/J$, but also the initial angle $\delta_i$, and the equilibrium angle $\delta_{Eq-crit}$. This method, however, has a limitation in that it may fail to converge, in which case the determination based on $\delta_{Eq-crit}$ at 612 may be relied upon.

At 618, the updated parameter values from 614 may be used to provide an indication of instability earlier in the transient. The critical transient shown in FIG. 4 and described in Eq. 8 may be plotted on the angle—slip plane to define a restraint region. When plotted on the same axis, the present values of the angle and slip may indicate a present operating state. If that state lies outside the restraint region, an unstable transient is identified. A second method based on a restraint region in the slip-acceleration plane, shown in FIG. 5 and described by Eq. 9, may be employed to confirm this identification and identify the amount by which the transmission path must be unloaded to restore stability. This method is also dependent on an accurate estimate of $\tau/J$.

Employing the update parameter values from 614, the transient response trajectory can be predicted to an arbitrary future time. The stability detection methods in 612 and 616 may be employed to act on either the presently measured state, or the predicted state. By predicting the state, remedial actions that are slow to take effect can be employed without penalty.

At 620, a remedial action may be determined based on dynamic conditions in the electric power system. The remedial action may be selected based on various factors and dynamic conditions, such as the existing angle, the slip, and the acceleration. An analysis of these system parameters may be relied upon to determine a remedial action. In one embodiment, the minimum path unloading calculated at 618 employing Eq. 9 may be used in conjunction with a prioritized list of sheddable loads to restore stability.

At 622, a response to the remedial action may be predicted, and at 624, method 600 may determine whether a modification of the remedial action is necessary based on the predicted response. In various circumstances, the predicted response may show that the remedial action implements unnecessary protective action (e.g., separation of portions of the electrical system); and accordingly, at 624, the remedial action may be modified to avoid the unnecessary actions. In some instances, the remedial action may comprise a generator set point adjustment (e.g., re-dispatch or runback) and/or load modification (e.g., load shedding, insertion of a dynamic brake). At 626, the remedial action may be implemented.

At 628, method 600 may monitor the response of the system to the remedial action. As part of the monitoring of the system response to the remedial action, method 600 may determine whether the event is concluded at 630. Once the event is concluded, method 600 may return to 602. In various embodiments, the event may be deemed to be concluded if the value of r, calculated using Eq. 3, falls below a specified threshold. In other embodiments, other measures of stability may be used to determine when the event is concluded. At 632, method 600 may determine whether additional instability is detected. In some embodiments, a new potentially destabilizing transient condition may be identified based on a rapid increase in the value of r or some other measure of stability. Upon detection of instability, method 600 may return to 620. If no additional instability is detected, method 600 may continue to monitor the response to the remedial action at 628.

Figure 7:
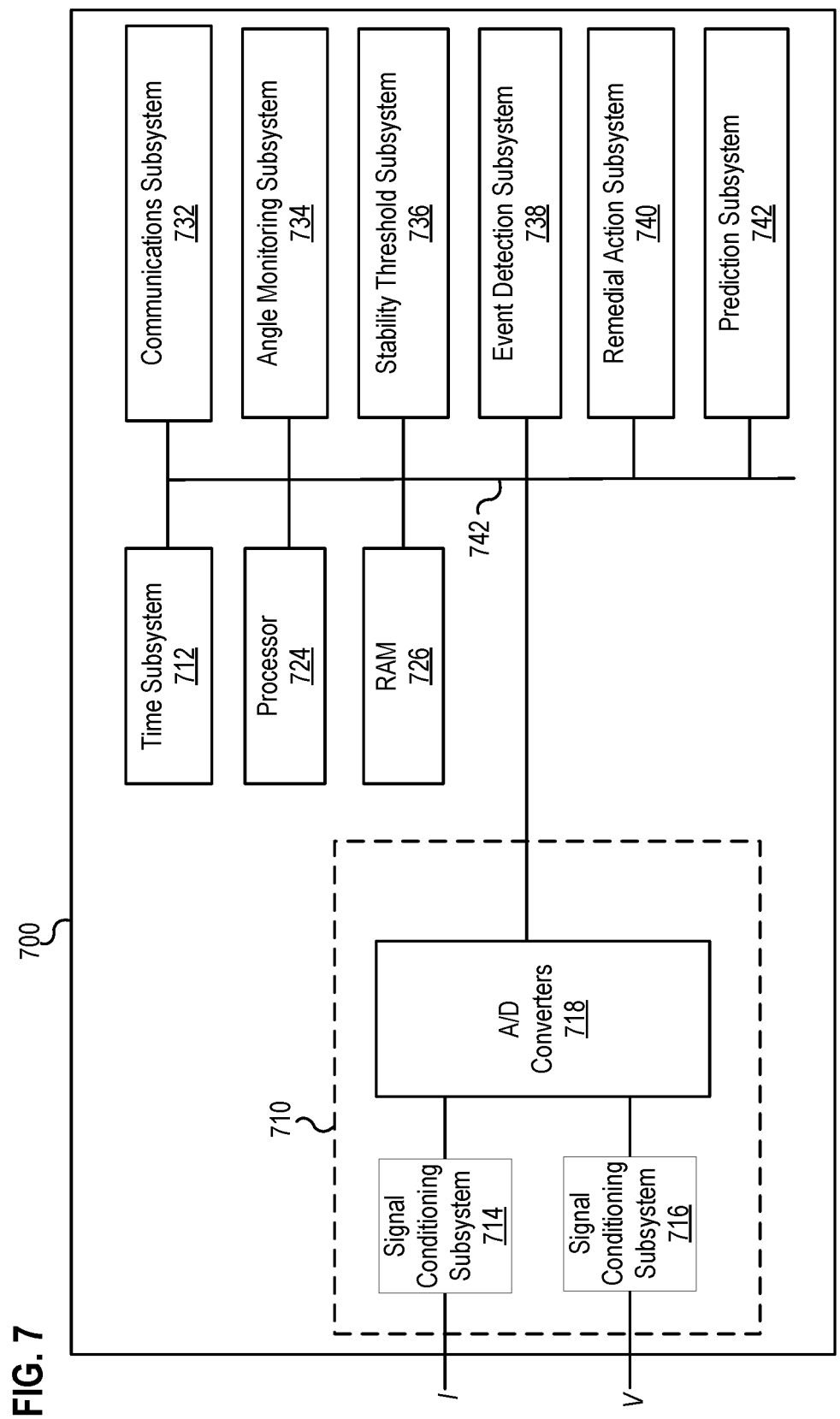
FIG. 7 illustrates a functional block diagram of one embodiment of a system configured to detect and remediate a potentially destabilizing transient condition consistent with embodiments of the present disclosure.

FIG. 7 illustrates a functional block diagram of one embodiment of a system 700 configured to detect and remediate a potentially destabilizing transient condition consistent with embodiments of the present disclosure. In some embodiments, system 700 may be implemented using hardware, software, firmware, and/or any combination thereof. Moreover, certain components or functions described herein may be associated with other devices or performed by other devices. The specifically illustrated configuration is merely representative of one embodiment consistent with the present disclosure. A data bus 742 may facilitate communication among various components of system 700.

System 700 includes a communications subsystem 732 configured to communicate with other devices (not shown), such as sources of measurements to be analyzed by system 700. System 700 may further include a time subsystem 712, which may be used to receive a time signal (e.g., a common time reference) allowing IED 700 to associate data with a time-stamp received from time system 712. In certain embodiments, a common time signal may be received via communications subsystem 732. One such embodiment may employ the IEEE 1588 protocol. The IEEE 1588 standard includes hardware-assisted timestamps, which allow for time accuracy in the nanosecond range. Such precision may be sufficient for applications requiring high fidelity time sources (e.g., the sampling of the sinusoidal currents and voltages on power lines to calculate synchrophasors).

Processor 724 may be configured to process communications received via communications subsystem 732, time subsystem 712, and to coordinate the operation of the other components of system 700. Processor 724 may operate using any number of processing rates and architectures. Processor 724 may be configured to perform any of the various algorithms and calculations described herein. Processor 724 may be embodied as a general purpose integrated circuit, an application specific integrated circuit, a field-programmable gate array, and/or any other suitable programmable logic device. Instructions to be executed by processor 724 may be stored in random access memory 726 (RAM).

In certain embodiments, system 700 may include a sensor component 710. In the illustrated embodiment, sensor component 710 is configured to gather data directly from equipment such as a conductor in an electric power distribution system. The sensor component 710 may include signal conditioning subsystems 714, 716 that are configured to condition the signal for use by system 700. In some embodiments, the signal conditioning subsystems 714, 716 may include transformers configured to step down a voltage or current to a suitable level for use by system 700 or filters configured to limit the bandwidth of signals. Sensor component 710 may further include A/D converters 718 that may sample and/or digitize conditioned waveforms to form corresponding digitized signals. The digitized signals may be provided to data bus 742 and accessed by other components of system 700. In one specific embodiment, the data gathered by sensor component 710 may be used to generate synchrophasor measurements that represent electrical conditions in an electric power system.

Angle monitoring subsystem 734 may be configured to monitor the angle between two or more rotating machines at either end of a critical power path in an electrical power system. In one embodiment, angle monitoring subsystem 734 may receive a first plurality of measurements representing electrical conditions of a first rotating machine at a first node in the electric power system and a second plurality of measurements representing electrical conditions of a second rotating machine at a second node machine in the electric power system. The angle may be determined based on the difference between the first plurality of measurements and the second plurality of measurements. The first plurality of measurements may be received by the communication subsystem 732 and the second plurality of measurements may be created by sensor component 710, or vice versa. In other embodiments, angle monitoring subsystem 734 may receive all measurements from either the communication subsystem 732 or the sensor component 710.

Stability threshold subsystem 736 may be configured to determine dynamic stability thresholds and related criteria used to detect a potentially destabilizing transient condition. In some embodiments, stability threshold subsystem 736 may be configured to generate system parameters, such as a slip scaling factor based on a maximum allowable slip for a marginally stable transient and/or an acceleration scaling factor based on a maximum allowable acceleration for the marginally stable transient. In some embodiments the slip scaling factor and the acceleration scaling factor may be calculated using Eqs. 1 and 2.

Event detection subsystem 738 may be configured to identify the occurrence of potentially destabilizing transient conditions. In one embodiment, event detection subsystem 738 may compare one or more metrics of instability to the dynamic stability thresholds determined by stability threshold subsystem 736. In some embodiments, Eq. 3 represents a stability metric that event detection subsystem 738 compares to stability thresholds to identify the occurrence of potentially destabilizing transient conditions. Further, in some embodiments, event detection subsystem 738 may monitor the response of an electric power system to a remedial action to determine if further instability arises. Remedial actions may be modified if instability arises while a remedial action is being implemented to maintain system stability.

Remedial action subsystem 740 may be configured to implement a remedial action based on the detection of a potentially destabilizing transient condition by event detection subsystem 738. In various embodiments, the remedial action may be based on the conditions in the electric power system, the system parameters, the angle, and other information. In response to various conditions, remedial action subsystem 740 may implement remedial actions, such as electrically separating components that are out of step, adjusting a generator set point, modifying a load, etc.

Prediction subsystem 742 may be configured to predict a response of the electric power system to a remedial action. In various embodiments, the predicted response may be used to adjust the remedial action to avoid unnecessary protective actions based on dynamic changes in the system. Still further, the prediction subsystem 742 may be configured to assess a delay associated with implementing a remedial action.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system configured to detect and remediate a potentially destabilizing transient condition in an electric power system, comprising:
    an angle monitoring subsystem configured to determine an angle between a first rotating machine and a second rotating machine based on a plurality of measurements and to determine at least one system parameter based on the angle;
    a stability threshold subsystem configured to determine a dynamic stability threshold to detect the potentially destabilizing transient condition based on the at least one system parameter;
    an event detection subsystem configured to compare at least one metric of instability to the dynamic stability threshold and to detect a first potentially destabilizing transient condition based on the comparison of the at least one metric of instability to the dynamic stability threshold;
    a remedial action subsystem configured to determine a first remedial action based on the metric of instability.

2. The system of claim 1, wherein the event detection subsystem is further configured to monitoring the at least one metric of stability following the remedial action and to detect a second potentially destabilizing transient condition based on a change in the at least one metric of stability; and
    wherein the remedial action subsystem is further configured to implement a second remedial action in response to the second potentially destabilizing transient condition.

3. The system of claim 1, wherein the system parameters comprise: a slip scaling factor based on a maximum allowable slip for a marginally stable transient and an acceleration scaling factor based on a maximum allowable acceleration for the marginally stable transient.

4. The system of claim 3, wherein the dynamic stability threshold comprises an ellipsoid based on one or more of the angle, a first derivative of the angle, and a second derivative of the angle.

5. The system of claim 1, wherein the event detection subsystem is further configured to determine a conclusion of the first potentially destabilizing transient condition based on one or more of the angle, a first derivative of the angle, and a second derivative of the angle.

6. The system of claim 1, wherein the event detection subsystem is further configured to:
    generate a first stability metric based on an estimate of a maximum restoring torque of the electric power system, $\tau$, and an equivalent system rotational inertia, J;
    generate a second metric independent of $\tau$ and J; and
    determine that the first potentially destabilizing transient condition causes one of the first stability metric and the second stability metric to trigger the dynamic stability threshold.

7. The system of claim 6, wherein a first stability assessment comprises one of an equal area criterion for power system transient stability and a non-linear optimization based on the angle, a first derivative of the angle, and a second derivative of the angle.

8. The system of claim 6, wherein a second stability assessment comprises a maximum transient outswing acceleration region bounded by an upper limit.

9. The system of claim 8, wherein the upper limit comprises one of 90 degrees and an estimated critical equilibrium angle.

10. The system of claim 1, wherein the plurality of measurements comprises:
    a first plurality of measurements representing electrical conditions of a first rotating machine at a first node in the electric power system; and
    a second plurality of measurements representing electrical conditions of a second rotating machine at a second node machine in the electric power system;
    wherein the first node and the second node are separated by one or more electrical transmission lines.

11. The system of claim 1, wherein the modified remedial action comprises one of a generator set point adjustment and a load modification.

12. The system of claim 1, wherein the predicted response subsystem is further configured to assess a delay associated with implementing the first remedial action.

13. The system of claim 1, further comprising:
    a predicted response subsystem configured to determine a response of the electric power system to the first remedial action.

14. The system of claim 13, wherein the remedial action subsystem is further configured to assess the response of the electric power system to the first remedial action, to modify the first remedial action based on the predicted response, and to implement the modified remedial action.

15. A method for detecting and remediating potentially destabilizing transient conditions in an electric power system, comprising:
    determining an angle between a first rotating machine and a second rotating machine based on a plurality of measurements;
    determining at least one system parameter based on the angle;
    determining a dynamic stability threshold for detecting the potentially destabilizing transient condition based on the system parameter;
    comparing at least one metric of instability to the dynamic stability threshold;
    detecting a first potentially destabilizing transient condition based on the comparison of the at least one metric of instability to the dynamic stability threshold;
    determining a first remedial action based on the metric of instability.

16. The method of claim 15, further comprising:
    monitoring the at least one metric of stability following the remedial action;
    detecting a second potentially destabilizing transient condition based on a change in the at least one metric of stability; and
    implementing a second remedial action in response to the second potentially destabilizing transient condition.

17. The method of claim 15, wherein the system parameters comprise: a slip scaling factor based on a maximum allowable slip for a marginally stable transient and an acceleration scaling factor based on a maximum allowable acceleration for the marginally stable transient.

18. The method of claim 17, wherein the dynamic stability threshold comprises an ellipsoid based on one or more of the angle, a first derivative of the angle, and a second derivative of the angle.

19. The method of claim 15, further comprising determining a conclusion of the first potentially destabilizing transient condition based on one or more of the angle, a first derivative of the angle, and a second derivative of the angle.

20. The method of claim 19, wherein a first stability assessment comprises one of an equal area criterion for power system transient stability and a non-linear optimization based on the angle, a first derivative of the angle, and a second derivative of the angle.

21. The method of claim 19, wherein a second stability assessment comprises a determination based on the angle and a critical equilibrium angle for transient stability.

22. The method of claim 21, wherein the critical equilibrium angle for transient stability is 90 degrees and an estimated critical equilibrium angle.

23. The method of claim 15, wherein comparing at least one metric of instability to the dynamic stability threshold comprises:

generating a first stability metric based on an estimate of a maximum restoring torque of the electric power system, $\tau$, and an equivalent system rotational inertia, J;

generating a second metric independent of $\tau$ and J; and determining that the first potentially destabilizing transient condition causes one of the first stability metric and the second stability metric to trigger the dynamic stability threshold.

24. The method of claim 15, wherein the plurality of measurements comprises:

a first plurality of measurements representing electrical conditions of a first rotating machine at a first node in the electric power system; and a second plurality of measurements representing electrical conditions of a second rotating machine at a second node machine in the electric power system;

wherein the first node and the second node are separated by one or more electrical transmission lines.

25. The method of claim 15, wherein the modified remedial action comprises one of a generator set point adjustment and a load modification.

26. The method of claim 15, wherein the predicted response of the electric power system comprises an assessment of a delay associated with implementing the first remedial action.

27. The method of claim 15, further comprising:
determining a predicted response of the electric power system to the first remedial action.

28. The method of claim 27, further comprising:
modifying the first remedial action based on the predicted response; and
implementing the modified remedial action.

* * * * *